United States Patent
Kodama et al.

(10) Patent No.: US 6,913,109 B2
(45) Date of Patent: Jul. 5, 2005

(54) VEHICLE STEERING CONTROL SYSTEM

(75) Inventors: Kazumasa Kodama, Toyota (JP); Masahiro Miyata, Kariya (JP)

(73) Assignee: Toyoda Koki Kabushiki Kaisha, Kariya (JP)

(*) Notice: Subject to any disclaimer, the term of this patent is extended or adjusted under 35 U.S.C. 154(b) by 114 days.

(21) Appl. No.: 10/626,611

(22) Filed: Jul. 25, 2003

(65) Prior Publication Data

US 2004/0238261 A1 Dec. 2, 2004

(30) Foreign Application Priority Data

Jul. 26, 2002  (JP) ........................................ 2002-217813

(51) Int. Cl.⁷ .............................................. B62D 5/04
(52) U.S. Cl. ........................ 180/446; 701/41; 180/421; 180/422
(58) Field of Search ................................ 180/421, 422, 180/443, 444, 446; 701/41–43

(56) References Cited

U.S. PATENT DOCUMENTS

| | | | | |
|---|---|---|---|---|
| 5,927,430 A | * | 7/1999 | Mukai et al. ................ | 180/446 |
| 6,026,926 A | * | 2/2000 | Noro et al. .................. | 180/446 |
| 6,070,692 A | * | 6/2000 | Nishino et al. .............. | 180/443 |
| 6,594,568 B2 | * | 7/2003 | Matsuoka .................... | 701/41 |

FOREIGN PATENT DOCUMENTS

| JP | 11-334604 | 12/1999 |
|---|---|---|
| JP | 11-334628 | 12/1999 |

OTHER PUBLICATIONS

U.S. Appl. No. 10/626,639, filed Jul. 25, 2003, Kodama et al.
U.S. Appl. No. 10/626,611, filed Jul. 25, 2003, Kodama et al.
U.S. Appl. No. 10/626,644, filed Jul. 25, 2003, Kodama et al.
U.S. Appl. No. 10/626,591, filed Jul. 25, 2003, Kodama et al.
U.S. Appl. No. 10/626,625, filed Jul. 25, 2003, Kodama et al.
U.S. Appl. No. 10/626,626, filed Jul. 25, 2003, Kodama et al.

* cited by examiner

*Primary Examiner*—Lesley D. Morris
*Assistant Examiner*—L. Lum
(74) *Attorney, Agent, or Firm*—Oblon, Spivak, McClelland, Maier & Neustadt, P.C.

(57) ABSTRACT

A vehicle steering control system is provided which is capable of reliably protecting a motor for driving a wheel steering shaft. In the system, a current sensor and a motor rotational speed detection section respectively detect a current applied to the steering shaft drive motor and the motor rotational speed of the steering shaft drive motor, and current inference means infers the motor current applied to the steering shaft drive motor based on the detected motor rotational speed. Abnormal judgment means compares the current inference value obtained by the current inference means with a current detection value indicated by the current sensor to judge whether the current sensor is normal or not. Abnormal judgment output means outputs the result of the abnormal judgment when the current sensor is judged to be abnormal. When a trouble occurs that the current sensor fails to operate normally due to the malfunction or the like, such a trouble can be recognized at the early stage of the malfunction. Therefore, it can be successfully obviated that the current sensor has fallen in the malfunction, nevertheless the operation of the motor is continued as usual.

6 Claims, 10 Drawing Sheets

130

| Vehicle Speed (V) | $V_1$ | $V_2$ | $V_3$ | ....... | $V_n$ |
|---|---|---|---|---|---|
| Steering Angle Conversion Ratio (α) | $\alpha_1$ | $\alpha_2$ | $\alpha_3$ | ....... | $\alpha_n$ |

$\alpha = \theta / \varphi$      $\varphi$ : Handle Shaft Angular Position
                  $\theta$ : Steering Shaft Angular Position

| Vs \ Δθ | Vs$_1$ | Vs$_2$ | Vs$_3$ | Vs$_4$ | ... | Vs$_n$ |
|---|---|---|---|---|---|---|
| Δθ$_1$ | η$_{11}$ | η$_{12}$ | η$_{13}$ | η$_{14}$ | ... | η$_{1n}$ |
| Δθ$_2$ | η$_{21}$ | η$_{22}$ | η$_{23}$ | η$_{24}$ | ... | η$_{2n}$ |
| Δθ$_3$ | η$_{31}$ | η$_{32}$ | η$_{33}$ | η$_{34}$ | ... | η$_{3n}$ |
| Δθ$_4$ | η$_{41}$ | η$_{42}$ | η$_{43}$ | η$_{44}$ | ... | η$_{4n}$ |
| ⋮ | ⋮ | ⋮ | ⋮ | ⋮ | ⋮ | ⋮ |
| Δθ$_m$ | η$_{m1}$ | η$_{m2}$ | η$_{m3}$ | η$_{m4}$ | ... | η$_{mn}$ |

η : Duty Ratio $\Delta\theta = \theta' - \theta$

θ' : Target Steering Shaft Angular Position

θ : Present Steering Shaft Angular Position

VEHICLE STEERING CONTROL SYSTEM

INCORPORATION BY REFERENCE

This application is based on and claims priority under 35 U.S.C. sctn. 119 with respect to Japanese Application No. 2002-217813 filed on Jul. 26, 2002, the entire content of which is incorporated herein by reference.

BACKGROUND OF THE INVENTION

1. Field of the Invention

The present invention relates to a steering control system for a motor vehicle such as, for example, a motorcar.

2. Discussion of the Related Art

In the field of steering devices for vehicles and especially, in the field of steering devices for motorcars, for higher performance, there has recently been developed a system incorporating a so-called "variable steering angle ratio converting mechanism" which is capable of varying the conversion ratio of a handle steering angle to a wheel steering angle (steering conversion ratio) in dependence on the traveling state of the vehicle without keeping the manipulation angle of a steering handle (handle manipulation angle) and a wheel steering angle fixed at a one-to-one ratio. For example, the vehicle speed can be exemplified as representing the vehicle traveling state, and in the system, the stability in a high speed traveling can be ensured by making the steering conversion ratio small so that the steering angle does not increase sharply with increase in the handle manipulation angle during the high speed traveling. During a slow speed traveling, on the contrary, the steering conversion ratio is made larger so that the number of rotations needed to make a full turn of the handle is decreased. This advantageously makes it possible that the manipulation with a large steering angle as required for, e.g., garaging, in-line parking, pulling-over to the kerb or the like can be performed very easily.

For example, as disclosed in Japanese unexamined, published patent application No. 11-334604 (1999-334604), a mechanism for changing the steering conversion ratio is constituted by directly connecting a handle shaft and a wheel steering shaft with a gear type transmission unit whose gear ratio is variable. However, this type of the mechanism involves a drawback that the gear ratio changing mechanism of the gear type transmission unit is complicated in construction. Another type of the mechanism has been proposed in, for example, Japanese unexamined, published patent application No. 11-334628 (1999-334628), wherein a wheel steering shaft is rotationally driven by a motor. More specifically, a wheel steering angle finally needed is calculated through a computer processing based on a steering conversion ratio which is determined in dependence on a handle manipulation angle detected by an angle detection section and the traveling state of the vehicle, and the wheel steering shaft is rotationally driven by the motor with the handle shaft being disconnected mechanically therefrom thereby to bring the wheel steering angle into coincidence with that calculated.

In the foregoing steering control method, the frequency in operation of the motor for rotationally driving the wheel steering shaft increases very high due to the frequent handle manipulations performed during the driving of the vehicle. Accordingly, in improving the maintenance capability of the motorcar practicing the control method of this kind, it is important to ensure that the motor can operate stably over a long period of time. For example, motors tend to deteriorate their performances when continued to be operated for a long period of time in such a state that an excess current or overcurrent is applied thereto due to an overload or the like. Therefore, it becomes effective to use the motor under a moderate protection by monitoring the current value applied to the motor by means of a current sensor and by restraining the electric current to the motor when the state of overcurrent is detected.

However, where some reason causes the current sensor become unable to operate normally, it becomes impossible to restrain the application of electric current to the motor as expected, whereby the motor tends to run for a shorter life.

SUMMARY OF THE INVENTION

Accordingly, it is a primary object of the present invention to provide an improved vehicle steering control system capable of reliably protecting a motor from the overcurrent or the like even where a current sensor does not continue to operate normally, thereby enhancing the maintenance capability of the control system.

Briefly, according to the present invention, there is provided a vehicle steering control system of the type wherein a steering angle to be given to a wheel steering shaft is determined in dependence on a steering angle given to a handle shaft for steering operation and the driving state of said vehicle so that the wheel steering shaft is rotationally driven by a steering shaft drive motor to be given the determined steering angle. The control system comprises a current sensor for detecting a current applied to the steering shaft drive motor; a motor rotational speed detection section for detecting the motor rotational speed of the steering shaft drive motor; and current inference means for inferring the motor current applied to the steering shaft drive motor based on the motor rotational speed detected by the motor rotational speed detection section. The control system further comprises abnormal judgment means for comparing the current inference value obtained by the current inference means with a current detection value indicated by the output of said current sensor and for judging whether the current sensor is normal or not, based on the result of the comparison; and abnormal judgment output means for outputting the result of the abnormal judgment when the current sensor is judged to be abnormal.

With this construction, not only the current flowing through the steering shaft drive motor is detected by the current sensor, but also the motor rotational speed is detected to calculate the current inference value of the motor from the detection result. Then, the current inference value is compared with the current detection value indicated by the output of the current sensor, whereby it can be judged whether the current sensor is normal or not. Accordingly, even when a trouble occurs that the current sensor fails to operate normally due to the malfunction or the like, such a trouble can be recognized at the early stage of the malfunction. Thus, there can be effectively obviated a drawback that the current sensor has fallen in the malfunction, nevertheless the operation of the motor is continued as usual. As a result, the motor can be reliably protected from the overcurrent or the like, so that the maintenance capability of the system can be enhanced.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which:

FIG. 7 is an explanatory view showing a two-dimensional table for use in determining a duty ratio (η) in dependence upon a power supply voltage (Vs) to a motor and an angular difference (Δθ);

DETAILED DESCRIPTION OF THE PREFERRED EMBODIMENT

Figure 1:
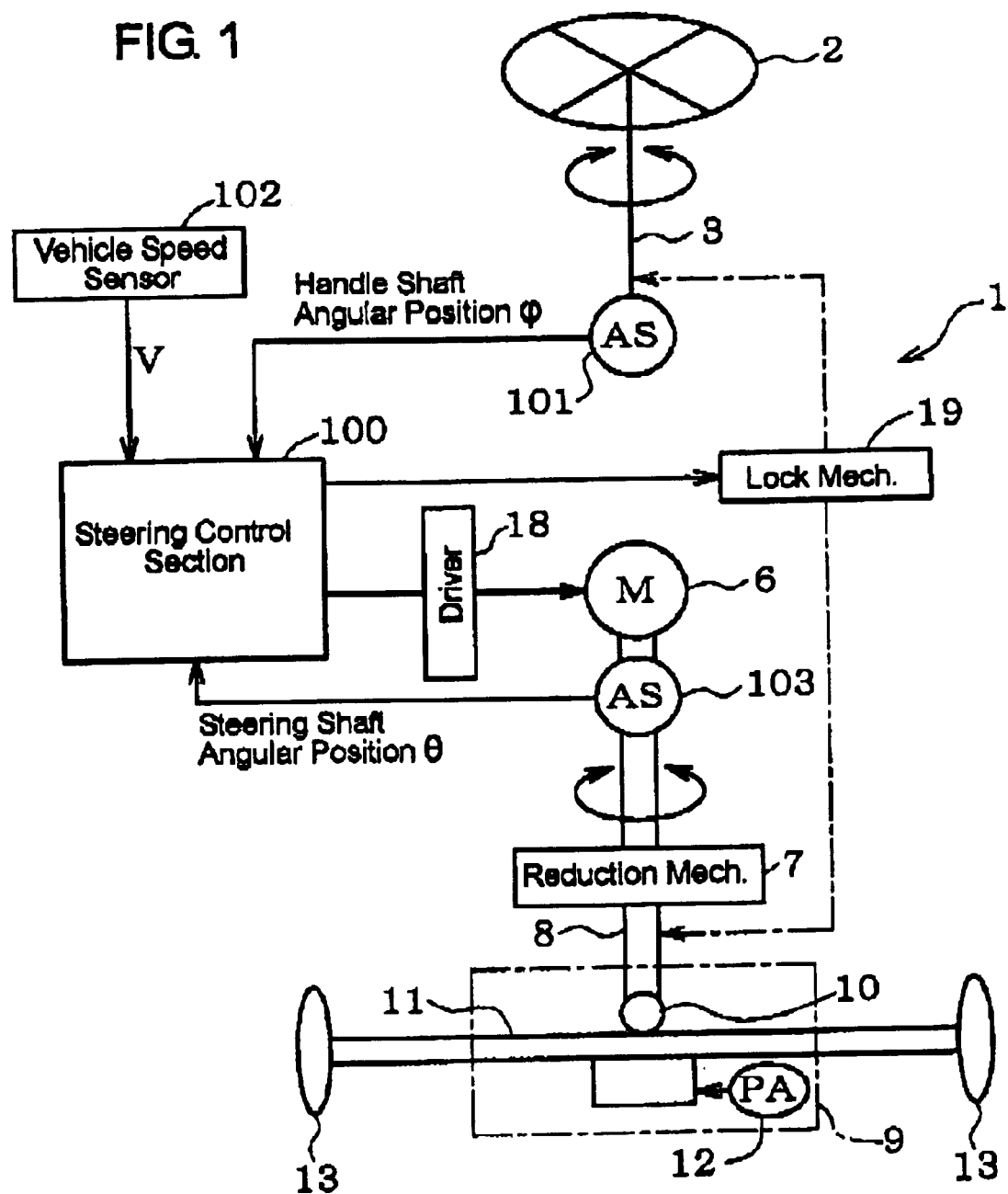
FIG. 1 is a schematic view showing the general construction of a vehicle steering control system in the embodiment according to the present invention.

Hereafter, an embodiment of the present invention will be described with reference to the accompanying drawings. FIG. 1 schematically shows one example of the general configuration of a vehicle steering control system to which the present invention is applied. Herein, the term "vehicle" means a motorcar or automobile, but it is to be noted that the subject to which the present invention is applied is not limited to the motorcar or automobile. A vehicle steering control system 1 takes the configuration that a handle shaft 3 in direct connection with a steering handle 2 is separated mechanically from a wheel steering shaft 8. The wheel steering shaft 8 is rotationally driven by a steering shaft drive motor (hereafter simply as "motor") 6. The wheel steering shaft 8 extends into a steering gear box 9, and a pinion 10 rotatable bodily with the wheel steering shaft 8 operates to reciprocally move a rack bar 11 in the axial direction thereof thereby to vary the steered angle of wheels 13, 13. In the vehicle steering control system 1 of the embodiment, there is employed a power steering device of the type that the reciprocation movement of the rack bar 11 is power-assisted by a well-known power assist mechanism of hydraulic type, electric type or electric-hydraulic type.

The angular position (φ) of the handle shaft 3 is detected by a handle shaft angle detection section 101 composed of a well-known angle detection section such as a rotary encoder. On the other hand, the angular position (θ) of the wheel steering shaft 8 is detected by a steering shaft angle detection section 103 composed of a well-known angle detection section such as a rotary encoder likewise. In the present embodiment, a vehicle speed detection section (vehicle speed sensor) 102 for detecting the vehicle speed (V) is provided as a driving state detection section for detecting the driving state of the vehicle. The vehicle speed detection section 102 is constituted by a rotation detection section (e.g., rotary encoder or tachogenerator) for detecting the rotational speed of the wheels 13 for example. A steering control section 100 determines a target angular position (θ') of the wheel steering shaft 8 based on the detected angular position (φ) of the handle shaft 3 and the detected vehicle speed (V) and controls the operation of the motor 6 through a motor driver 18, so that the angular position (θ) of the wheel steering shaft 8 comes close to the target angular position (θ').

Between the handle shaft 3 and the wheel steering shaft 8, there is provided a lock mechanism 19 which is switchable between a lock state that the both shafts 3, 8 are locked to be rotated bodily and an unlock state that the locking connection is released. In the lock state, the rotational angle of the handle shaft 3 is transmitted directly to the wheel steering shaft 8 without being converted, that is, at a one-to-one steering conversion ratio, so that manual steering is established. The switching-over of the lock mechanism 19 to the lock state is effected by an instruction from the steering control section 100 at the occurrence of an abnormality or the like.

Figure 2:
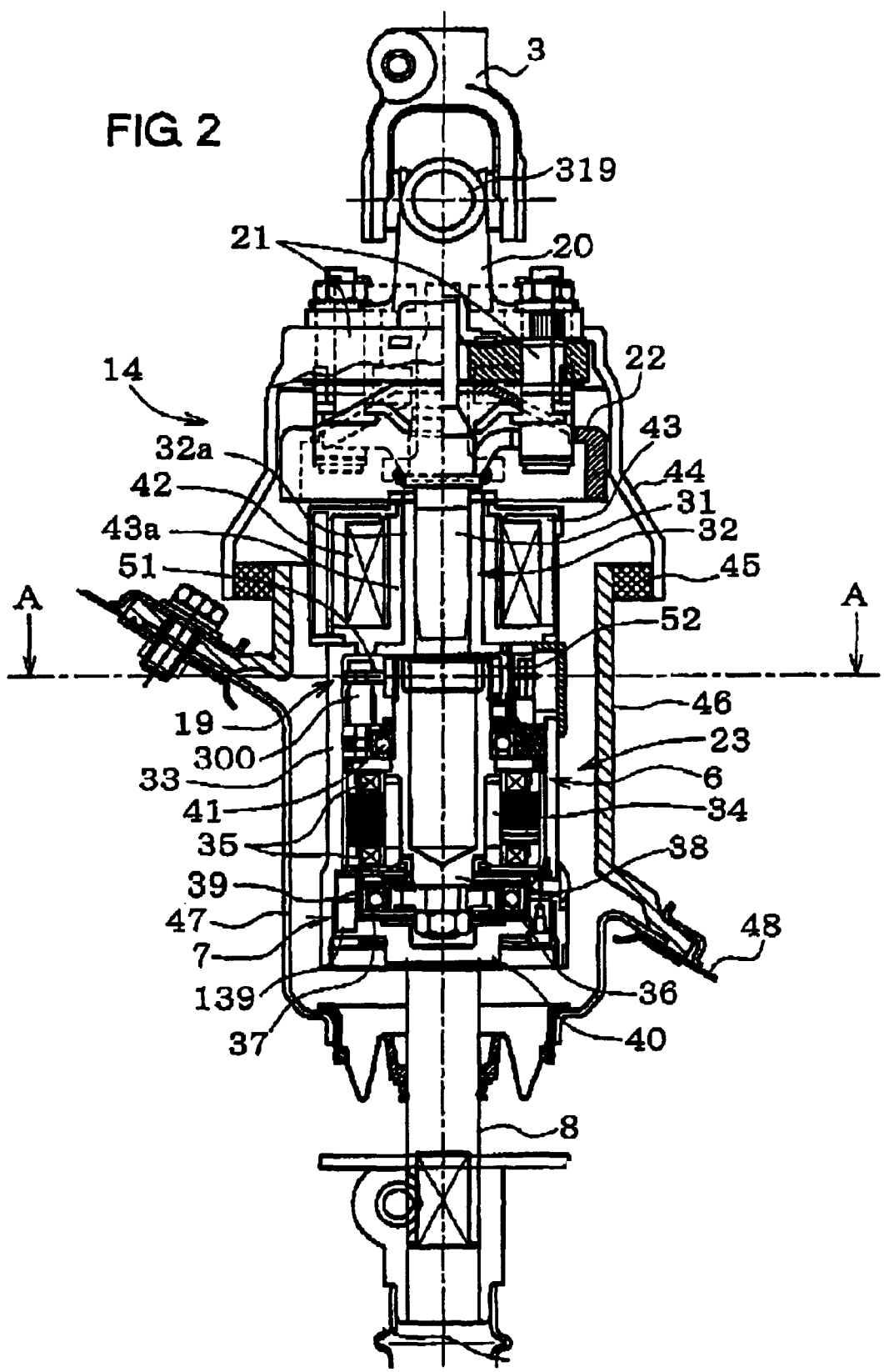
FIG. 2 is a longitudinal sectional view showing one embodiment of a drive section unit.

FIG. 2 shows an example of the configuration of a drive section unit 14 having the motor 6 for the wheel steering shaft 8 with the drive section unit 14 being mounted on the vehicle. The drive section unit 14 is so constituted that when the handle shaft 3 is rotated by the manipulation of the handle 2 (see FIG. 1), a motor casing 33 is rotated bodily with the motor 6 incorporated therein. In this particular embodiment, the handle shaft 3 is connected through a universal joint 319 with an input shaft 20, which is connected to a first coupling member 22 by means of bolts 21, 21. The first coupling member 22 is bodily formed with a pin 31. This pin 31 is engaged and inserted into a sleeve 32a which extends rearward from the center of a plate portion of a second coupling member 32. The cylindrical motor casing 33 is made integral with the other surface of the plate member of the second coupling member 32. A numeral 44 denotes a cover made of rubber or resin and is rotatable with the handle shaft 3. Further, a numeral 46 denotes a casing for housing the drive section unit 14 integrated onto a cockpit panel 48, and a numeral 45 denotes a seal ring for sealing a juncture portion between a cover 44 and the casing 46.

Figure 3:
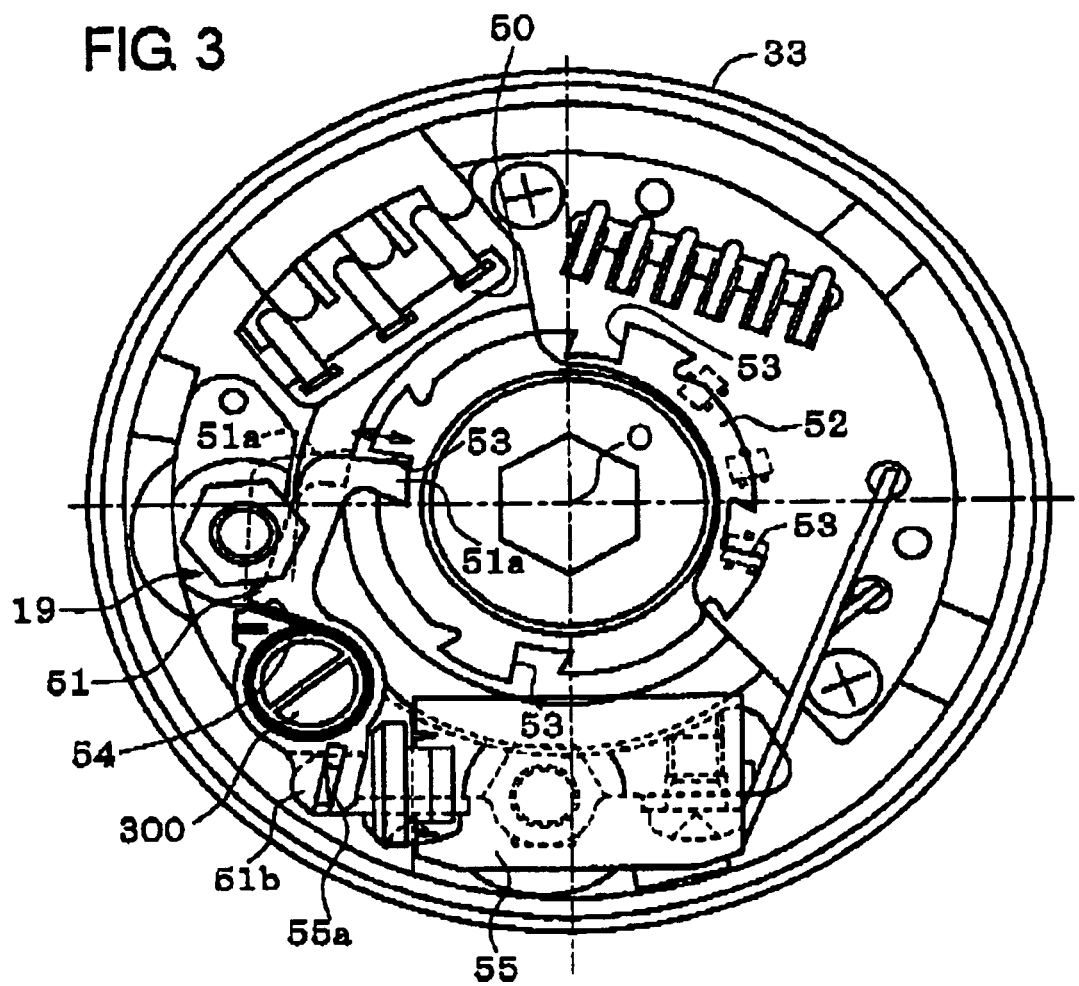
FIG. 3 is a cross-section taken along the line A—A in FIG. 2.

Inside the motor casing 33, stator parts 23 of the motor 6 including coils 35, 35 are assembled integrally. Inside the stator parts 23, a motor output shaft 36 is assembled to be rotatable through bearings 41. An armature 34 composed of permanent magnets is united on the external surface of the motor output shaft 36, and the coils 35, 35 are arranged with the armature 34 being put therebetween. As shown in FIG. 3, a power supply terminal 50 is taken out from the coils 35, 35 to face at the rear surface of the motor casing 33, and the electric power for the coils 35, 35 is supplied to the power supply terminal 50 through a supply cable 42.

As described later, the motor 6 in this particular embodiment is a brushless motor, and the supply cable 42 is constituted in the form of a belt-like collective cable to which wires are collected for individually supplying electric power to the coils 35, 35 for respective phases of the brushless motor 6. A cable casing 43 with a hub 43a is provided in abutting contact with the rear end surface of the motor casing 33, and the supply cable 42 is housed therein having been wound like a coil around the hub 43a. The terminal of the supply cable 42 opposite to that connected to the supply terminal 50 is secured to the hub 43b of the cable casing 43. When the handle shaft 3 is rotated together with the motor casing 33 and hence, together with the supply terminal 50 in the positive-going direction or the negative-going direction, the supply cable 42 within the cable casing 43 is brought about to be coiled around the hub 43b or uncoiled therefrom thereby to play its role to absorb the rotation of the motor casing 33.

The rotation of the motor output shaft 36 is transmitted to the wheel steering shaft 8 after being reduced by a reduction mechanism 7 to a predetermined ratio (e.g., 1/50). The reduction mechanism 7 in this particular embodiment is constituted by a harmonic drive reduction mechanism. More specifically, the motor output shaft 36 is provided bodily thereon with an elliptical bearing 37 with an inner race, around which a deformable, thin outer gear 38 is fit. Internal gears 39, 139 united bodily with the wheel steering shaft 8 through a coupling 40 are in mesh with the external gear portion of the outer gear 38. The internal gears 39, 139 comprise those hereinafter referred to as "first internal gear 39" and as "second internal gear 139" which are arranged in co-axial alignment. The first internal gear 39 is fixed to the motor casing 33 for bodily rotation therewith, while the second internal gear 139 is not fixed to the motor casing 33 thereby to be rotatable relative thereto. The first internal gear 39 has no difference in the number of teeth from the outer gear 38 meshed therewith, so that the relative rotation of the first internal gear 39 to the outer gear 38 does not take place. In other words, the first internal gear 39 and hence, the motor casing 33 and the handle shaft 3 are so connected with the motor output shaft 36 as to effect idle rotation. On the other hand, the second internal gear 139 is made larger by two (2) for example in the number of teeth than the outer gear 38. Thus, assuming now that the number in teeth of the second internal gear 139 is (N) and the difference in the number of teeth between the outer gear 38 and the second internal gear 139 is (n), the second internal gear 139 transmits the rotation of the motor output shaft 36 to the wheel steering shaft 8 at the reduction ratio of (n/N). For smaller construction, the internal gears 39, 139 in this particular embodiment are arranged in co-axial alignment with the input shaft 20 of the handle shaft 3, the motor output shaft 36 and the wheel steering shaft 8.

As best shown in FIG. 3, the lock mechanism 19 is composed of a lock member 51 secured to a lock base part (e.g., the motor casing 33 in this particular embodiment) which is not rotatable relative to the handle shaft 3, and a lock receiving member 52 provided at a lock receiving base part (e.g., the motor output shaft 36 in this particular embodiment). The lock member 51 is provided to be movable between a lock position where it is engaged with a lock receiving portion 53 formed on the lock receiving member 52 and an unlock position where it retracted away from the lock receiving portion 53. In this particular embodiment, the lock receiving member 52 which rotates bodily with the wheel steering shaft 8 is formed at a circumferential surface thereof with plural (e.g., four) lock receiving portions 53 at regular intervals. The lock portion 51a provided at one end of the lock member 51 is engageable with any one of the plural lock receiving portions 53 selectively in dependence upon the rotational angular phase of the wheel steering shaft 8. The handle shaft 3 is connected through the coupling 22 and pins (not numbered) with the motor casing 33 not to be rotatable relative thereto.

When the lock member 51 is disengaged from the lock receiving member 52 (i.e., in the case of unlock), the motor output shaft 36 is rotated relative to the motor casing 33, and such rotation of the motor output shaft 36 is transmitted through the outer gear 38 to the first internal gear 39 and the second internal gear 139. Since the first internal gear 39 secured to the motor casing 33 does not rotate relative to the outer gear 38 as mentioned previously, it rotates at the same speed as the handle shaft 3 in consequence. That is, the first internal gear 39 is rotated to follow the manipulation of the steering handle 2. The second internal gear 139 transmits the rotation of the motor output shaft 36 to the wheel steering shaft 8 at a reduced speed thereby to rotationally drive the wheel steering shaft 8. On the contrary, when the lock member 51 and the lock receiving member 52 are engaged to be brought into the lock state, the motor output shaft 36 is not rotatable relative to the motor casing 3. Since of the internal gears 39 and 139 of the reduction mechanism 7, the first internal gear 39 is secured to the motor casing 33, the rotation of the handle shaft 3 is transmitted without being reduced in speed to the wheel steering shaft 8 through the first internal gear 39, the outer gear 38 and the second internal gear 139 in order.

In this particular embodiment, the lock receiving member 52 is secured on the external surface of one end of the motor output shaft 36, and each of the lock receiving portions 53 is formed like a cutout groove which is cut into the lock receiving member 52 radially inwardly thereof. Further, as shown in FIG. 2, the lock member 51 is supported on a rotational base 300 provided on the motor casing 33 and is rotatable about an axis extending almost in parallel with the wheel steering shaft 8. The lock member 51 is connected at its rear end portion 55a with a solenoid 55. A resilient member 54 is provided for resiliently returning the lock member 51 to a home position thereof when the solenoid 55 is relieved of being energized. A protrusion 55a formed at one end of the solenoid 55 is fit in a groove formed at the rear end portion 51b of the lock member 51, so that the solenoid 55 is able to move or rotate the lock member 51 to the lock position against the resilient member 54. Thus, upon the energization or de-energization of the solenoid 55, the lock portion 51a of the lock member 51 is brought into engagement with the lock receiving member 52 for a lock operation or disengagement therefrom for an unlock operation. It is selectable to use the energization of the solenoid 55 for the lock operation or the unlock operation. In this particular embodiment, the energization of the solenoid 55 is determined to bring about the unlock operation. With this arrangement, when the solenoid 55 is relieved from the energization in the event of the power cut-off, the resilient member 54 works to bring the lock member 51 into the lock state, so that it becomes possible to perform the manual steering.

Figure 4:
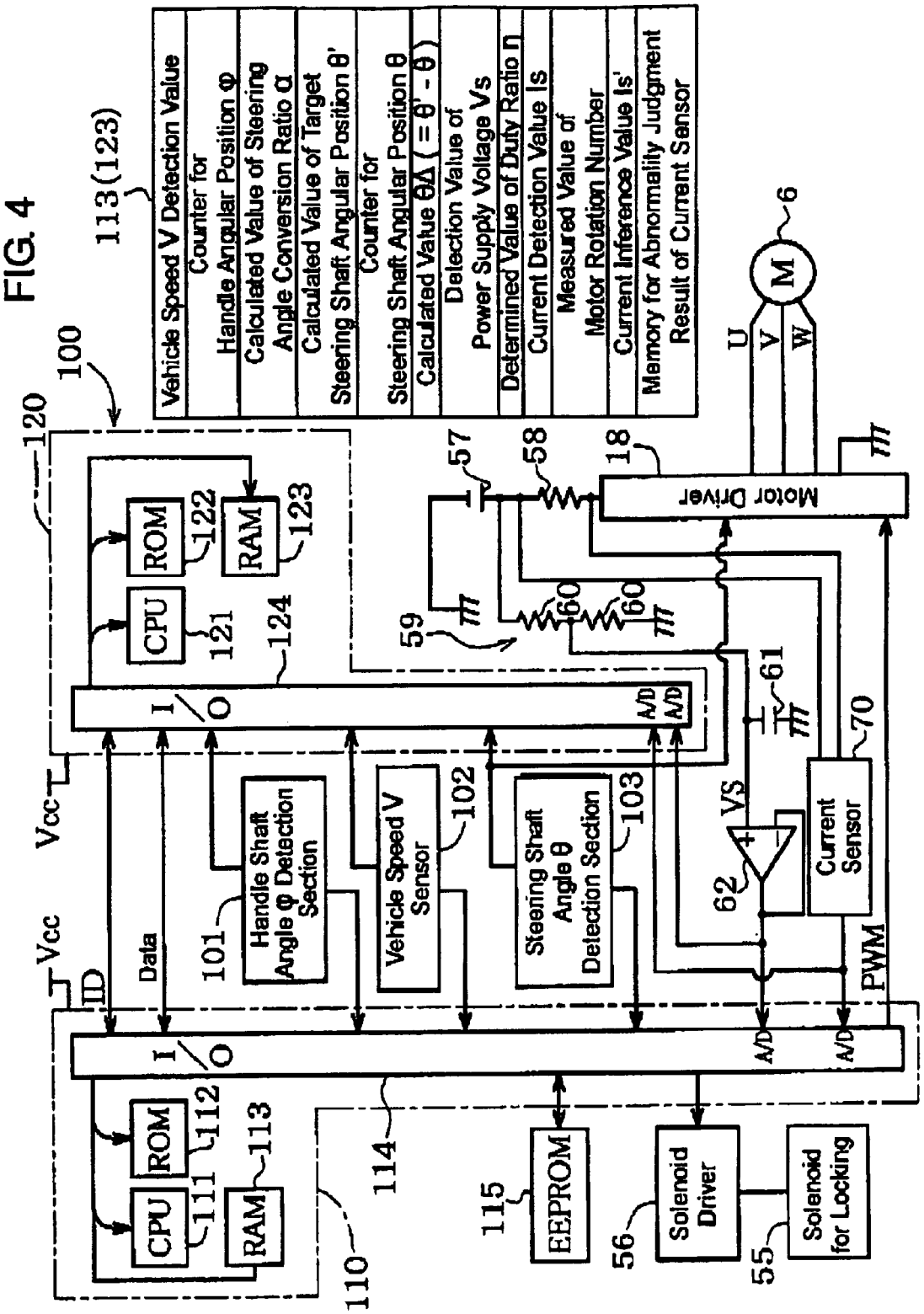
FIG. 4 is a block diagram showing the electric configuration of the vehicle steering control system.

FIG. 4 is a block diagram exemplifying the electric configuration of the steering control section 100. Two microcomputers 110 and 120 make key components of the steering control section 100. The main microcomputer 110 is composed of a main CPU 111, a ROM 112 storing control programs, a RAM 113 serving as a working area for the CPU 111 and an input/output interface 114. The secondary or sub microcomputer 120 is composed of a sub CPU 121, a ROM 122 storing control programs, a RAM 123 serving as a working area for the sub CPU 121 and an input/output interface 124. It is the main microcomputer 110 that directly controls the operation of the motor 6 for driving the wheel steering shaft 8. The sub microcomputer 120 performs data processing of various kinds such as parameter arithmetic operations which are necessary for the operation control of the motor 6, in parallel operation with the main microcomputer 110. The sub microcomputer 120 communicates with the main microcomputer 110 for the conveyance of the results of such data processing, so that it performs its role as a support control section which observes and confirms whether the operation of the main microcomputer 110 is normal or not and which completes information for the main microcomputer 110, as the need arises. The data communication between the main microcomputer 110 and the sub microcomputer 120 in this particular embodiment is performed by the communication between the input/output interfaces 114 and 124. The both of the microcomputers 110 and 120 are supplied with a supply voltage (e.g., +5V) from a stabilized power supply (not shown) even after the termination in operation of the vehicle, so that the RAMs 113, 123 and an EPROM 115 referred to later are able to maintain the contents stored therein.

Each output from the handle shaft angle detection section 101, the vehicle speed detection section 102 and the steering shaft angle detection section 103 is distributed to the input/output interfaces 114 and 124 of the main microcomputer 110 and the sub microcomputer 120. In this particular embodiment, each of the sections 101, 102 and 103 is constituted by a rotary encoder, whose count signal is input directly to digital data ports of input/output interfaces 114 and 124 through a schmitt trigger circuit, not shown. Further, the solenoid 55 constituting a driver section of the aforementioned lock mechanism 19 is connected to the input/output interface 114 of the main microcomputer 110 through a solenoid driver 56.

The motor 6 is constituted by a brushless motor or a three-phase brushless motor in this embodiment, whose rotational speed is controlled in a known PWM (Pulse Width Modulation) control method. The motor driver 18 is connected to a vehicle-mounted battery 57 serving as a power supply for the motor 6. The voltage i.e., supply voltage (Vs), of the battery 57 which is applied to the motor driver 18 varies (e.g., from 9 to 14 volts) from time to time in dependence upon the states of various loads arranged at many parts of the vehicle as well as upon the state of the power generation by an alternator. In this particular embodiment, the battery voltage (Vs) which fluctuates like this is used as the motor supply voltage as it is, without being controlled by any stabilized power supply circuit. The steering control section 100 carries out the control of the motor 6 by the use of the power supply voltage (Vs) which fluctuates within a considerable range as mentioned previously, and hence, is provided with a detection section for the power supply voltage (Vs). More specifically, in this particular embodiment, a branch path for voltage detection is taken out from an energizing path to the motor 6, that is, from right before the driver 18, and a voltage detection signal is extracted through voltage divider resistances 60, 60 provided on the branch path. The voltage detection signal is smoothened by a condenser 61 and is input through a voltage follower 62 to input ports (hereafter referred to as "A/D ports") each with an A/D converter function of the input/output interfaces 114 and 124.

Figure 12:
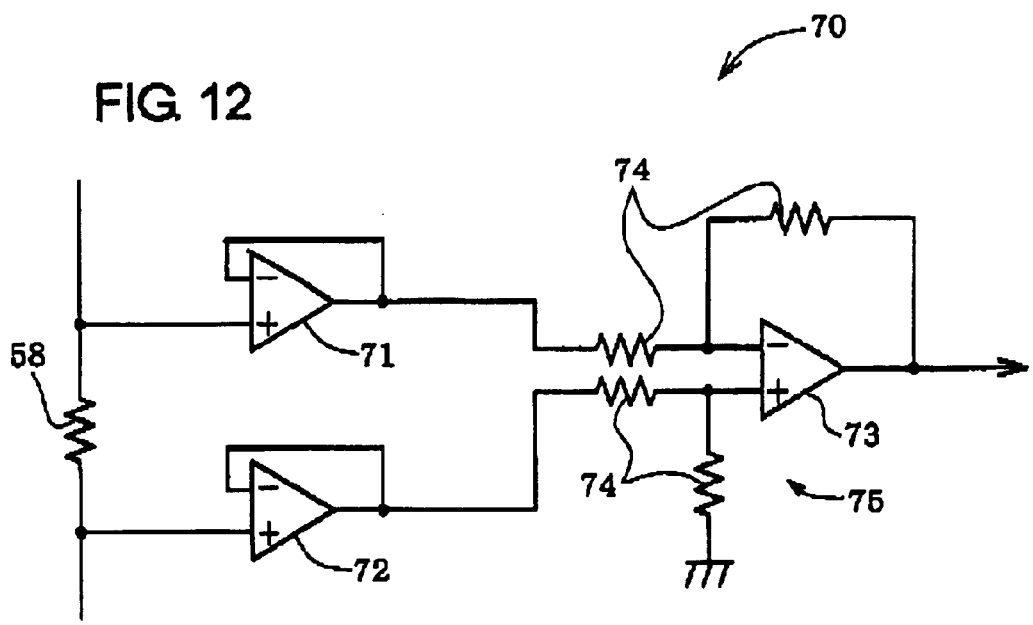
FIG. 12 is a circuit diagram exemplifying a current sensor.

In order to observe the state of the current being applied to the motor 6 such as the occurrence of an overcurrent, a current detection section is provided on the path of the current being applied to the motor 6. More specifically, a current sensor 70 is provided to detect the voltage across a shunt resistance 58 provided as a current detection resistance on that path, and the detected voltage is input the A/D ports of the input/output interfaces 114 and 124. As shown in FIG. 12, the current sensor 70 extracts the voltage across the shunt resistance 58 by means of voltage followers 71, 72 and amplifies the extracted voltage by a differential amplifier circuit 75 so as to output therefrom. The differential amplifier circuit 75 is composed of an operational amplifier IC (Integrated Circuit) 73 and resistances 74 connected around the same. The output from the differential amplifier circuit 75 represents that proportional to the value of the current flowing through the shunt resistance 58, so that it can be used as the voltage detection output. Besides the shunt resistance, there may be used any probe such as a hall sensor, a current detection coil or the like which detects electric current based on the principles of electromagnetism.

Referring back to FIG. 4, each of the RAMs 113, 123 of the microcomputers 110, 120 is formed with the following memory areas.

(1) Vehicle speed detection value memory: to store the detection value of a present vehicle speed (V) from the vehicle speed sensor 102.
(2) Handle shaft angle position ($\phi$) counter memory: to count counting number signals from a rotary encoder constituting the handle shaft angle position detection section 101 and to store the count value representing the handle shaft angle position ($\phi$). The rotary encoder used is of the type that it is capable of discriminating the rotational direction thereof and increments or decrements its count content when the rotational direction is in a positive-going direction or a negative-going direction.
(3) Steering angle conversion ratio ($\alpha$) calculated value memory: to store the steering angle conversion ratio ($\alpha$) calculated based on the vehicle speed detection value.
(4) Target steering shaft angular position ($\theta'$) calculation value memory: to store a target value of the steering shaft angular position calculated from the multiplication ($\phi \times \alpha$) for example based on the present handle shaft angular position ($\phi$) and the steering angle conversion ratio ($\alpha$), that is, to store a target steering shaft angular position ($\theta'$).
(5) Steering shaft angular position ($\theta$) counter memory: to count counting signals from the rotary encoder constituting the steering shaft angle detection section 103 and to store the count value representing the steering shaft angular position ($\theta$). The steering shaft angle detection section 103 is to detect the rotation of the steering shaft drive motor 6 and is constituted by an incremental type rotary encoder capable of discriminating the rotational direction thereof. The detection section 103 increments the aforementioned counter when the wheel steering shaft 8 is rotated in the positive-going direction and decrements it when the wheel steering shaft 8 is rotated in the negative-going direction.
(6) $\Delta\theta$ calculation value memory: to store the difference $\Delta\theta$ ($=\theta'-\theta$) between the target steering shaft angular position ($\theta'$) and the present steering shaft angular position ($\theta$).
(7) Power supply voltage (Vs) detection value memory: to store the detection value of the power supply voltage (Vs) to the motor 6.
(8) Duty ratio ($\eta$) determination value memory: to store a duty ratio ($\eta$) determined based on $\Delta\theta$ and the power supply voltage (Vs) for the application of current to the motor 6 under the PWM control.
(9) Current detection value (Is) memory: to store a current detection value (Is) detected by the current sensor 70.
(10) Motor rotation number (rotational speed) detection value memory: to store the motor rotation number which is calculated from a time-dependence change of the rotational number of the motor 6 represented by the steering shaft angle position counter.
(11) Current inference value (Is') memory: to store a current inference value (Is') calculated in the method referred to later.
(12) Current sensor abnormality judgment result memory: to store the result of abnormality judgment which is made of the current sensor 70 based on the comparison result between the current detection value (Is) and the current inference value (Is').

With the foregoing arrangements or preparations made, the main microcomputer 110 functions as the following various means in accordance with control programs having been stored in the ROM 112, simultaneously of which the sub microcomputer 120 performs the same processing as the main microcomputer 110 does, in accordance with programs having been stored in the ROM 122 to observe the operation of the main microcomputer 110.

① Motor rotational speed detection section: for sampling the value of the steering shaft angle position counter at a predetermined time interval (e.g., several hundreds microseconds) to detect the motor rotation number (rotational speed) based on the change in the motor angular position indicated by the count value.
② Current inference means: for obtaining a current inference value (Is') of the motor 6 based on the detected motor rotation number (rotational speed).
③ Abnormal judgment means: for comparing the foregoing current inference value (Is') with the current detection value (Is) represented by the output of the current sensor 70 to judge whether the current sensor 70 is abnormal or not, based on the comparison result.

④ Abnormal judgment output means: for outputting the abnormality judgment result when the current sensor 70 is judged to be abnormal.

⑤ Lock control means: for switching over the energizing state of the locking solenoid 55 of the lock mechanism 19 to bring the handle shaft 3 and the wheel steering shaft 8 into the locking connection with each other and for discontinuing the rotation of the motor 6 when the result of the abnormality judgment on the current sensor 70 is given.

⑥ Duty ratio determination means: for determining the duty ration ($\eta$) for the PWM control of the motor 6 in dependence on the detection value of the power supply voltage (Vs).

Further, the input/output interface 114 of the main microcomputer 110 is provided with as a second memory section the EEPROM (Electrically Erasable Programmable ROM) 115 for storing the angular position of the wheel steering shaft 8 upon termination of the operation (i.e., at the time of the ignition switch being turned OFF), that is, the angular position of the wheel steering shaft 8 at the shutdown. The EEPROM (PROM) 115 enables the main CPU 111 to read out data therefrom when it is under a first operation voltage (+5V) wherein the main CPU 111 performs data read-out/write-in with respect to the RAM 113 therefor. On the other hand, the EEPROM (PROM) 115 enables the main CPU 111 to execute data write-in thereinto when it is placed under a second operation voltage different from the first operation voltage (in this particular embodiment, there is employed a higher voltage such as, e.g., +7V than the first operating voltage). Thus, even in the event that the main CPU 111 runs under the out-of-control, it does not happen that the stored content of the EEPROM 115 can be rewritten by mistake. The second operation voltage is generated by a voltage boost-up circuit not shown which is interposed between the EEPROM 115 and the input/output interface 114.

The operation of the vehicle steering control system 1 as constructed above will be described hereafter.

Figure 8:
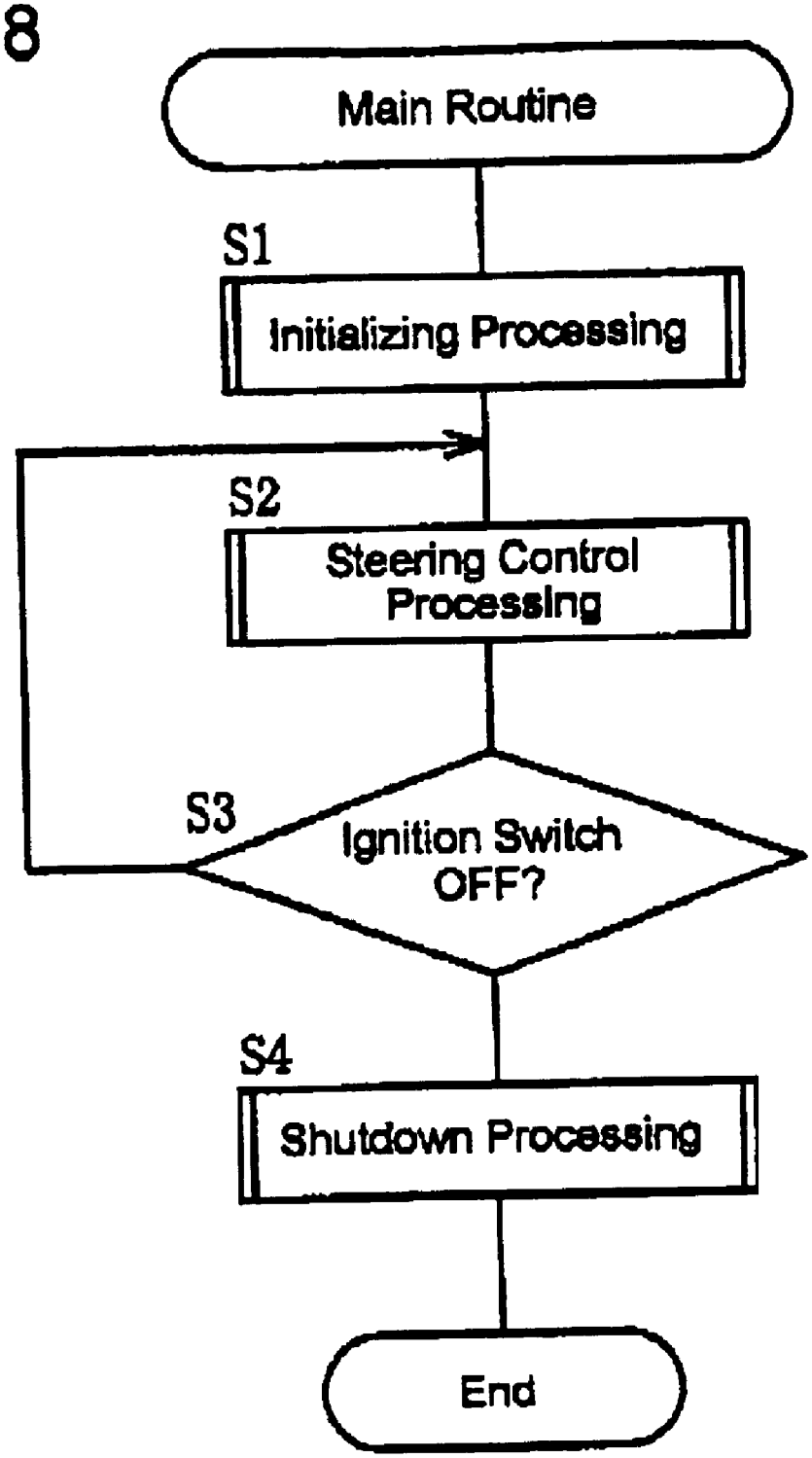
FIG. 8 is a flow chart showing a main routine for computer processing in the vehicle steering control system.

FIG. 8 shows the operation flow of a main routine of the control program executed by the main microcomputer 110. Step S1 is for an initializing processing, whose essential is to read out the shutdown angular position referred to later of the wheel steering shaft 8 which has been written into the EEPROM 115 through a shutdown processing executed when the ignition switch was turned OFF at the last time and then, to set the read-out shutdown angular position as an initial angular position of the wheel steering shaft 8 at the processing starting. To be concrete, a counter value representing the shutdown angular position is set into the aforementioned steering shaft angular position counter memory. A flag for indicating the completion of data write-in into the EEPROM 115 as referred to later is cleared at this time.

Figures 5, 6:
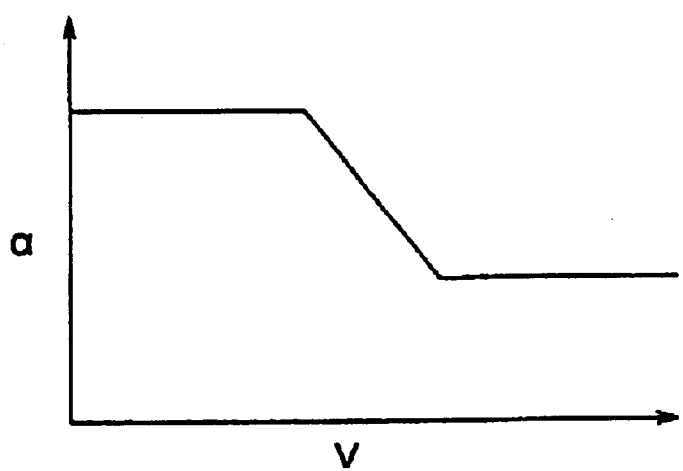
FIG. 5 is an explanatory view showing a table making relation between steering angle conversion ratios and vehicle speeds.
FIG. 6 is a graph showing a pattern in which the steering angle conversion ratio is varied with increase in vehicle speed.
Figure 9:
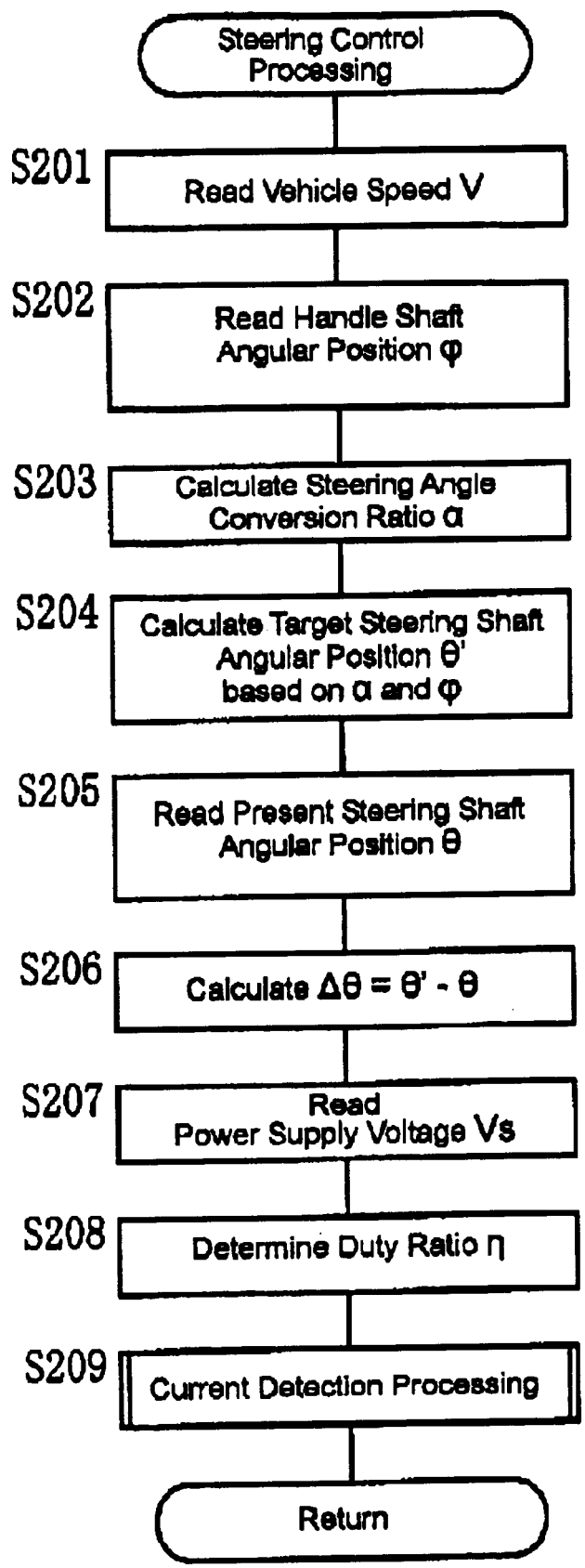
FIG. 9 is a flow chart showing one example of the details of a steering control processing S2 shown in FIG. 8.

Upon completion of the initialization, the routine proceeds to step S2 to execute the steering control processing. This processing is repetitively executed at a constant time interval (e.g., several hundred microseconds) to equalize the intervals for parameter samplings. The details of this processing will be described with reference to FIG. 9. The detection value of a present vehicle speed (V) is read at step S201, and the handle shaft angular position ($\phi$) is read at step S202. The steering conversion ratio ($\alpha$) for converting the handle shaft angular position ($\phi$) into the target steering shaft angular position ($\theta'$) based on the calculated value of the vehicle speed (V) is determined at step S203. The steering conversion ratio ($\alpha$) is set to a different value depending on the vehicle speed (V). More specifically, as shown in FIG. 6, the steering conversion ratio ($\alpha$) is set to be smaller when the vehicle speed (V) is larger than a predetermined value, but is set to be larger when it is smaller than the predetermined value. In this particular embodiment, each of the ROMs 112, 122 has in advance stored therein a table 130 defining various set values of the steering angle conversion ratio ($\alpha n$) which correspond respectively to various vehicle speeds (Vn), as shown in FIG. 5, and a steering conversion ratio ($\alpha$) corresponding to the present vehicle speed (V) is calculated in a well-known interpolation method by reference to the table 130. Although in the present embodiment, the vehicle speed (V) is utilized as information representing the driving state of the vehicle, information of another kind such as the lateral pressure acting on the vehicle body, the inclination angle of the road surface or the like may be detected by a sensor therefor as information representing the driving state of the vehicle, and the steering conversion ratio ($\alpha$) may be set to a particular value in dependence upon the detected value. In another modified form, a basic value of the steering conversion ratio ($\alpha$) is determined in dependence upon the vehicle speed (V) and as the need arises, may be compensated for the aforementioned other information except for the vehicle speed (V) for use as the steering conversion ratio ($\alpha$).

Step S204 involves calculating the target steering shaft angular position ($\theta'$) by multiplying the determined steering conversion ratio ($\alpha$) with the detected handle shaft angular position ($\phi$). Then, the present steering shaft angular position ($\theta$) is read at step S205. Step S206 is executed to calculate the difference ($\Delta\theta=\theta'-\theta$) between the target steering shaft angular position ($\theta'$) and the present steering shaft angular position ($\theta$) obtained from the steering shaft angular position counter. Further, the detection value of the present power supply voltage (Vs) is read at step S207.

The motor 6 rotationally drives the wheel steering shaft 8 to decrease the difference ($\Delta\theta$) between the target steering shaft angular position ($\theta'$) and the present steering shaft angular position ($\theta$). In order that the present steering shaft angular position ($\theta$) approaches quickly and smoothly to the target steering shaft angular position ($\theta'$), the rotational speed of the motor 6 is made high when the difference ($\Delta\theta$) is large, but low when the same is small. Basically, there is performed a proportional control taking the difference ($\Delta\theta$) as parameter. In order to restrain the overshooting, hunting and the like for a more stabilized control, preferably, a well-known PID control is performed taking the differentiation or integration of the difference ($\Delta\theta$) into account.

The motor 6 is operated under the PWM control as mentioned earlier, and the rotational speed is adjusted by varying the duty ratio ($\eta$). The duty ratio ($\eta$) is determined at step S208 in FIG. 9. If the power supply voltage (Vs) were kept constant, the rotational speed could be adjusted exclusively in dependence upon the duty ratio ($\eta$). However, the power supply voltage in this embodiment is not constant as mentioned previously. Therefore, in this particular embodiment, the duty ratio ($\eta$) is determined taking into account the power supply voltage (Vs) in addition to the aforementioned difference ($\Delta\theta$). For example, each of the ROMs 112, 122 has stored therein a duty ratio conversion table 131 of a second dimension type which is prepared to define numerous duty ratios ($\eta$) in correspondence to various combinations of the power supply voltage (Vs) and the difference ($\Delta\theta$), as shown in FIG. 7, and one of the duty ratios ($\eta$) is selected in dependence on the detected value of the power supply voltage (Vs) and the calculated value of the difference ($\Delta\theta$). The rotational speed of the motor 6 fluctuates in dependence upon the variation in the load acting thereon, in which case a modification may be made that the state of the load acting on the motor 6 is inferred based on a detection value of the motor current (Is) from the current sensor 70 and that the duty ratio ($\eta$) is compensated for the inferred load state of the motor 6 before the actual use.

Figure 10:
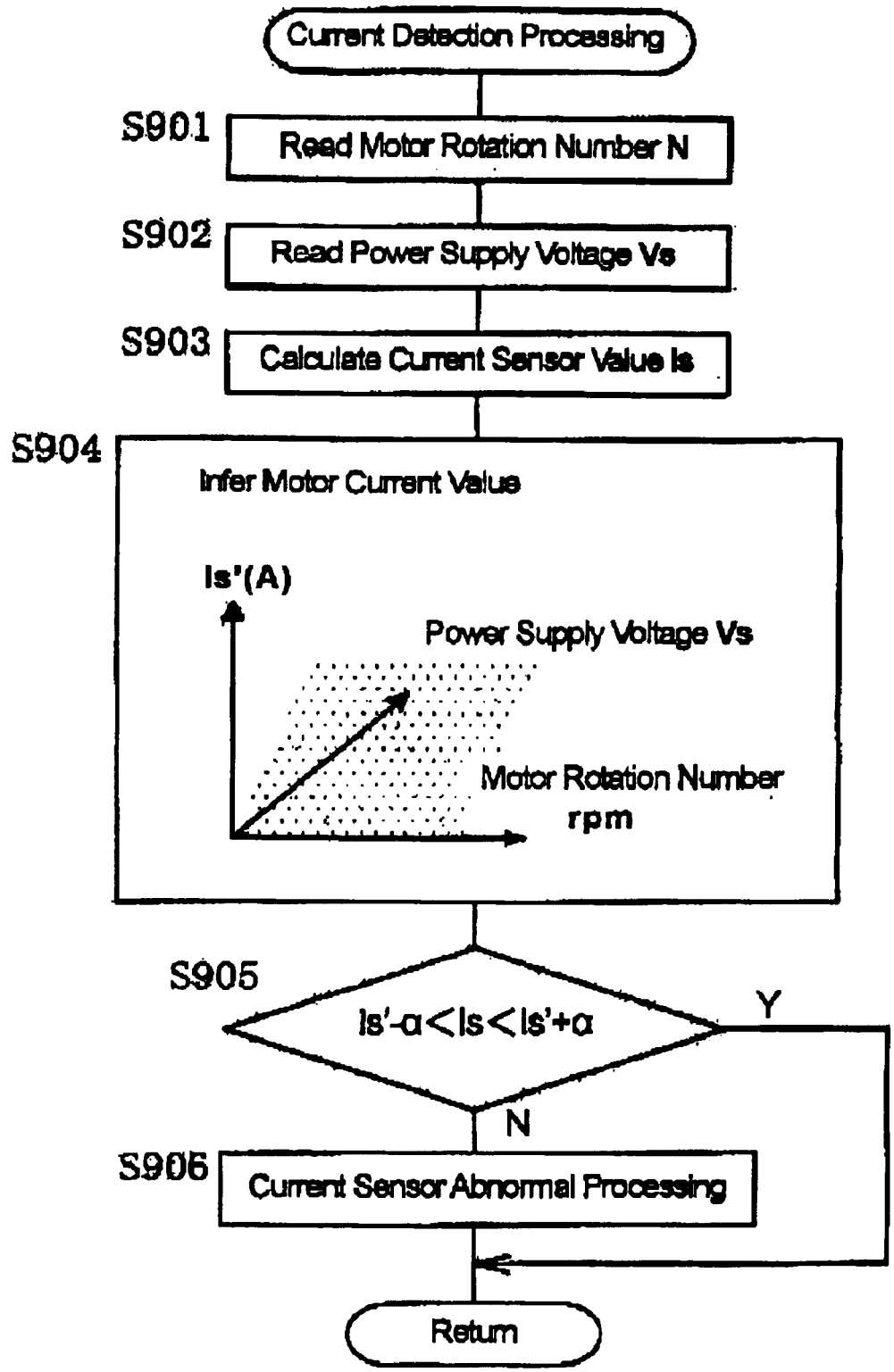
FIG. 10 is a flow chart showing one example of the details of a current detection processing S209 shown in FIG. 9.

Next, the routine proceeds to step S209 for a current detection processing, which is shown in FIG. 10 in detail. The present rotation number (N) of the motor 6 is calculated at step S901. The rotation number (N) can be calculated by sampling the value of the steering shaft angle counter at a constant time interval (e.g., several hundred microseconds) and by obtaining the increment in angle during the time interval. The detection value of the power supply voltage (Vs) is read at step S902, and the current detection value which the current sensor 70 outputs with respect to the motor 6 is read at step S903. As described earlier, the current sensor 70 detects the motor current value based on the voltage across the shunt resistance 58 which is provided on the motor power supply path leading from the vehicle-mounted battery 57 constituting the power supply for the motor 6 to the driver 18 for the motor 6.

Next, the current inference value (Is') is calculated at step S904. The current inference value (Is') can be calculated based on the back electromotive force which can be obtained from the supply voltage (Vs) to the motor 6, the inner resistance value (Rm) of the motor 6 and the motor rotation number (rotational speed) (N). When the supply voltage (Vs) is applied to the terminals of the motor 6 having the inner resistance value (Rm), a current of (Vs/Rm) flows in accordance with the Ohm's law. However, since the motor coils necessarily generate the back electromotive force of inductive nature as the motor 6 rotates, the current inference can be done relatively precisely by regarding the difference of the supply voltage (Vs) minus the back electromotive force as the inter-terminal voltage of the motor 6. The back electromotive force constant for use in calculating the back electromotive force from the motor rotation number (N) is the constant peculiar to each motor, and a value indicated in the motor specification or a value measured actually is used as the back electromotive force constant. In the case of brushless motors, almost all of the inner resistance value (Rm) is the winding resistance of the coils, and a value prescribed for such inner resistance in the motor specification is fixed for each motor 6. Of course, it is possible to use as the inner resistance value (Rm) the value obtained by actually measuring the inner resistance of the motor 6 to be used.

Further, the motor 6 is to be operated under the PWM control as mentioned earlier, and a chopper current depending on the duty ratio ($\eta$) is applied to the motor 6. In this case, the current inference value (Is') can be calculated relatively precisely as follows: That is, where the duty ratio of the PWM control, the power supply voltage to the steering shaft drive motor 6, the inner resistance of the steering shaft drive motor 6, the motor rotational speed and the back electromotive force of the motor 6 are represented respectively by the symbols ($\eta$), (Vs), (Rm), (N) and (Cre), the current inference value (Is') can be calculated by the following equation.

$$Is' = \{(Vs \times \eta - Cre \times N)/Rm\} \times \eta \ldots \quad (1)$$

The product (Vs×$\eta$) represents the average voltage which is made when the power supply voltage (Vs) is chopped at the duty ratio ($\eta$), and the product (Cre×N) represents the back electromotive force which is generated against the motor 6 rotating at the rotation number (N). Accordingly, the difference (Vs×$\eta$−Cre×N) means the average inter-terminal voltage of the motor 6. The quotient {(Vs×$\eta$−Cre×N)/Rm} means the current which is obtained where the continual current is applied under the inter-terminal voltage. However, since actually the current waveform is intermittent, the quotient is multiplied with the duty ratio ($\eta$), whereby the current inference value (Is') can be obtained.

As already explained hereinabove, the motor driver 18 receives the voltage from the vehicle-mounted battery 57 as the power supply voltage (Vs) without through any stabilized power supply circuit. Therefore, the steering control section 100 which controls the operation of the motor 6 determines the duty ratio ($\eta$) under the PWM control in dependence on the detection value of the power supply voltage (Vs) detected by the power supply voltage detection section. Of course, the foregoing calculation of the current inference value (Is') is also made using the power supply voltage (Vs) detected at step S207 in FIG. 9.

Referring back to FIG. 10, at step S905, the calculated current inference value (Is') is compared with the current detection value (Is) detected by the current sensor 70. It is checked whether or not the current detection value (Is) is within a predetermined reference current range which is determined based on the current inference value (Is'), namely, within the range of (Is'±$\alpha$) in this embodiment. If it is out of the range, the routine then proceeds to step S906, at which a current sensor abnormal processing is executed.

In this particular embodiment, where the current sensor 70 is judged to be abnormal or failure, the solenoid 55 for locking operation is brought into operation to connect the handle shaft 3 with the wheel steering shaft 8 by the lock mechanism 19, and the motor 6 is brought into the stop state. As a result, the manipulation force exerted on the handle shaft 3 is transmitted directly to the wheel steering shaft 8, so that the driving by manual steering can be continued. Further, the occurrence of the current sensor abnormality or failure may be reported by the lightening of an alarm lamp arranged on a cockpit panel or the like of the motorcar or by outputting an alarm audio output.

On the other hand, although not shown in the flow charts, another modification may be prepared for the case that the current sensor is judged to have not been abnormal or failure. That is, when the current detection value (Is) increases beyond a predetermined condition, an overcurrent is judged to have occurred, in which event it may be effective to bring the handle shaft 3 and the wheel steering shaft 8 into the locking state in the manner as described earlier thereby to discontinue the rotation of the motor 6. For example, where more than a predetermined period of time continues with the current detection value (Is) remaining higher than a limit value, the overcurrent is judged to have taken place, so that the foregoing lock mechanism 19 can be brought into operation. Of course, when the state of the overcurrent is judged to have been discontinued, the lock mechanism 19 is released from the locking operation. In case that the control like this is carried out, it is possible to continue the control operation by using the current inference value (Is') calculated in the foregoing method, in substitution for the current detection value (Is) when the current sensor 70 is judged to have been abnormal or failure.

It is often the case that the current (Is) detected through the shunt resistance 58 involves a current component attributed to other peripheral loads but the motor 6, in addition to the current flowing through the motor 6. In this case, it occurs that the current detection value (Is) detected by the current sensor 70 does not coincide with the inference value (Is') even if the current sensor 70 is normal or in order, because the current component attributed to the peripheral loads has been added to the current detection value (Is). Therefore, a precise judgment can be done where the current (Is) detected through the shunt resistance 58 is to be compared with that obtained by adding the inference value of the current component attributed to the peripheral loads to the inference value (Is') of the current flowing through the motor 6. In this particular embodiment, for example, the solenoid 55 shown in FIG. 4 for locking operation needs a relatively large current, and the current needed to energize the solenoid 55 is obtained in advance through actual measurement or inference. Further, whether the solenoid 55 has been energized or not is detected separately, and when the energization of the solenoid 55 is detected, the current through the solenoid 55 is added to the inference value (Is) for the motor 6 thereby to make a final inference value.

Figure 11:
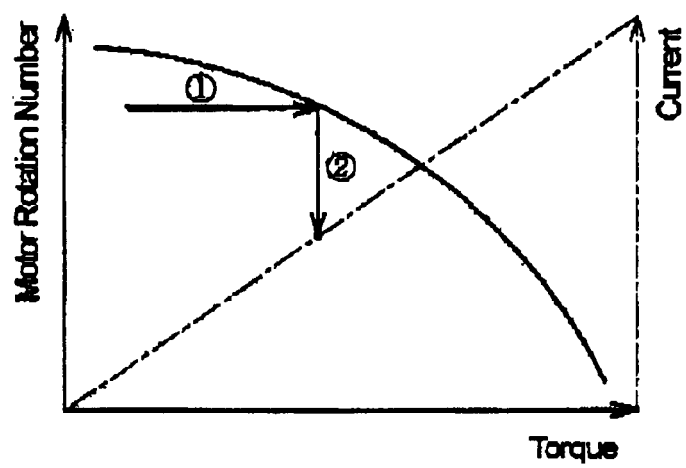
FIG. 11 is a graph for conceptually explaining a modified method of calculating a current inference value.

The current inference value (Is') may be calculated in other ways. As shown in FIG. 11, for example, on the assumption that such peripheral loads, together with the motor 6, have been incorporated into the steering control system 1, the relation between the torque of the motor 6 and the motor rotation number is prepared in advance, and further, the relation between the torque and the current of the motor 6 is prepared in advance. These relations are stored in ROMs 112, 122 in advance in the form of, e.g., tables or functional equations. Thus, the torque can be calculated based on the measured value of the rotation number (N) of the motor 6, and the current can be calculated from the calculated torque.

Referring back to FIG. 9, the foregoing processing up to step S209 is executed by both of the main microcomputer 110 and the sub microcomputer 120 shown in FIG. 4 in parallel time relation. For example, whether the operation of the main microcomputer 110 is normal or not is checked by transferring the arithmetic operation results of various parameters stored in the RAM 113 of the main microcomputer 110 to the sub microcomputer 120 from time to time or at a regular time interval to make the sub microcomputer 120 execute comparison with those stored in the RAM 123 of the same, whereby the sub microcomputer 120 is able to observe the occurrence of the malfunction or failure at the side of the main microcomputer 110. On the other hands, the main microcomputer 110 generates a PWM signal based on a determined duty ratio ($\eta$). The main microcomputer 110 outputs the PWM signal to the motor driver 18 while comparing the same with a feedback signal ($\theta$), as shown in FIG. 1, from the rotary encoder constituting the steering shaft angle detection section 103 to drive the motor 6 under the PWM control.

Referring back to FIG. 8, a judgment is made at step S3 of whether or not, the ignition switch has been turned OFF, and a shutdown processing at step S4 is executed when the ignition switch is judged to have been turned OFF. That is, the OFF state of the ignition switch means that the driving or operation of the motorcar has been terminated. In this case, the main microcomputer 110 reads out the shutdown angular position of the wheel steering shaft 8 stored in the steering shaft angular position counter to store the read-out shutdown angular position to the EEPROM 115 and further sets the data write-in completion flag provided in the RAM 113, whereby the shutdown processing at step S4 is completed.

As described hereinabove, in short, in the embodiment according to the present invention, the current flowing through the steering shaft drive motor 6 is detected by the current sensor 70, and the current inference value (Is') of the motor 6 is calculated from the detected motor rotational speed (N). Then, the current detection value (Is) actually detected by the current sensor 70 is compared with the current inference value (Is') at, e.g., step S905 in FIG. 10, to judge judged whether the current sensor 70 is normal or not. Accordingly, even when a trouble occurs that the current sensor 70 does not to operate normally or in order due to the malfunction or the like, such a trouble can be recognized at the early stage of the malfunction or failure, whereby there can be effectively obviated a drawback that the current sensor 70 is abnormal, nevertheless the operation of the motor 70 is continued as usual. As a result, the motor 70 can be reliably protected from the overcurrent or the like, so that the maintenance capability of the system can be enhanced.

In addition, the vehicle steering control system 1 in the illustrated embodiment takes the configuration that the handle shaft 3 and the wheel steering shaft 8 are separated mechanically. The lock mechanism 19 used therein is capable of being switched between the lock state that the bosh shafts are locked and connected for bodily rotation and the unlock state that the lock state is released. With this arrangement, when the steering control as designed cannot be performed due to a trouble in the system 1, the handle shaft 3 and the wheel steering shaft 8 are locked and connected with each other, so that the manual steering without any power assist can be done to continue the driving of the vehicle.

The lock control means is also provided for bringing the lock mechanism 19 into the lock state and for discontinuing the operation of the steering shaft drive motor 6 when the abnormality judgment output means (e.g., step S905) outputs to indicate the abnormality of the current sensor 70. When the current sensor 70 gets out of order, the repair of the same becomes necessary. In such an event, unless repaired, the current sensor 70 cannot perform the current detection correctly. Therefore, it is an effective counter measure to effect the switching to the manual steering by the handle 2 wherein the handle shaft 3 and the wheel steering shaft 8 are locked and connected, and to let the steering shaft drive motor 6 remain inoperative until the repair is completed.

Further, the vehicle steering control system 1 according to the foregoing embodiment is provided with motor operation restraining means for restraining the application of the electric current to the steering shaft drive motor 6 in dependence upon the result in current detection by the current sensor 70. In this modified form of the embodiment, when the result in the current detection by the current sensor 70 changes to represent the overcurrent of the steering shaft drive motor 6, the application of the electric current to the motor 6 is controlled adequately to restrain the overheating of the motor or the like, so that the life of the motor 6 can be elongated.

When receiving from the abnormality judgment output means an output indicating the abnormality of the current sensor, the motor operation restraining means uses the current inference value (Is') from the current inference means in substitution for the current detection value (Is) from the current sensor 70. Thus, even after the current sensor 70 comes not to operate in order, current restraint for preventing the motor 6 from being imposed of overcurrent can be continued without any difficulty. This current restraint can be done by the used of the aforementioned lock mechanism. That is, when the steering shaft drive motor 6 is brought into the state of overcurrent, the handle shaft 3 and the wheel steering shaft 8 are brought into lock connection to secure the steerable state and at the same time, the application of electric current to the motor 6 is restrained or discontinued, so that the overheating of the motor 6 can be avoided.

Obviously, numerous modifications and variations of the present invention are possible in light of the above teachings. It is therefore to be understood that within the scope of the appended claims, the present invention may be practiced otherwise than as specifically described herein.

What is claimed is:

1. A vehicle steering control system for a vehicle wherein a steering angle to be given to a wheel steering shaft is determined in dependence on a steering angle given to a handle shaft for steering operation and a driving state of said vehicle so that said wheel steering shaft is rotationally driven by a steering shaft drive motor to be given said determined steering angle, said control system comprising:

a current sensor for detecting a current applied to said steering shaft drive motor;

a motor rotational speed detection section for detecting a motor rotational speed of said steering shaft drive motor;

current inference means for inferring a motor current applied to said steering shaft drive motor based on the motor rotational speed detected by said motor rotational speed detection section;

abnormal judgment means for comparing said current inference value obtained by said current inference means with a current detection value indicated by an output of said current sensor and for judging whether said current sensor is properly operating, based on a result of the comparison; and judgment output means for outputting the result of judgment when said current sensor is judged to be not properly operating.

2. A vehicle steering control system as set forth in claim 1, wherein said handle shaft and said wheel steering shaft are mechanically separated; and wherein said system further comprises:

a lock mechanism switchable between a lock state that said handle shaft and said wheel steering shaft are locked bodily rotatably to directly transmit a manual steering force given to said handle shaft to said wheel steering shaft and an unlock state released from said lock state; and lock control means for bringing said lock mechanism into said lock state and for discontinuing the operation of said steering shaft drive motor when receiving the judgment result from said abnormal judgment output means representing that said current sensor is not properly operating.

3. A vehicle steering control system as set forth in claim 1, wherein a motor operation restraining means is further provided for restraining the application of electric current to said steering shaft drive motor based on the current detection result from said current sensor, and wherein said motor operation restraining means uses a current inference value obtained by said current inference means in substitution for said current detection value from said current sensor when receiving the judgment result from said abnormal judgment output means representing that said current sensor is not properly operating.

4. A vehicle steering control system as set forth in claim 1, wherein:

said current sensor detects said motor current value based on a voltage across a shunt resistance which is provided on a path leading from a vehicle-mounted battery constituting a power supply for said steering shaft drive motor to a driver for said steering shaft drive motor; and said current inference means calculates said current inference value based on a power supply voltage to said steering shaft drive motor, an inner resistance of said steering shaft drive motor and a back electromotive force calculated from said motor rotational speed.

5. A vehicle steering control system as set forth in claim 4, wherein said steering shaft drive motor is to be operated under PWM control; and wherein said current inference means calculates said current inference value (Is') by the following equation:

$$Is' = \{(Vs \times \eta - Cre \times N)/Rm\} \times \eta$$

where $\eta$: duty ratio in the PWM control

Vs: power supply voltage for said steering shaft drive motor

Rm: inner resistance of said steering shaft drive motor

N: rotational speed of said steering shaft drive motor, and

Cre: back electromotive force of said steering shaft drive motor.

6. A vehicle steering control system as set forth in claim 4, wherein:

said steering shaft drive motor is to be operated under PWM control;

said driver for said steering shaft drive motor is connected to receive as a power supply voltage (Vs) the voltage from said vehicle-mounted battery through a stabilized power supply circuit;

a steering control section for controlling the operation of said steering shaft drive motor includes a power supply voltage detection means for detecting said power supply voltage (Vs) and duty ratio determination means for determining a duty ratio ($\eta$) in said PWM control in dependence on a value of said power supply voltage (Vs); and a current inference means calculates said current inference value (Is') based on the value of said power supply voltage detected by said power supply voltage detection means.

* * * * *